No. 836,730. PATENTED NOV. 27, 1906.
J. P. & C. F. WRIGHT.
BOX FILLING MACHINE.
APPLICATION FILED JUNE 8, 1905.
11 SHEETS—SHEET 1.
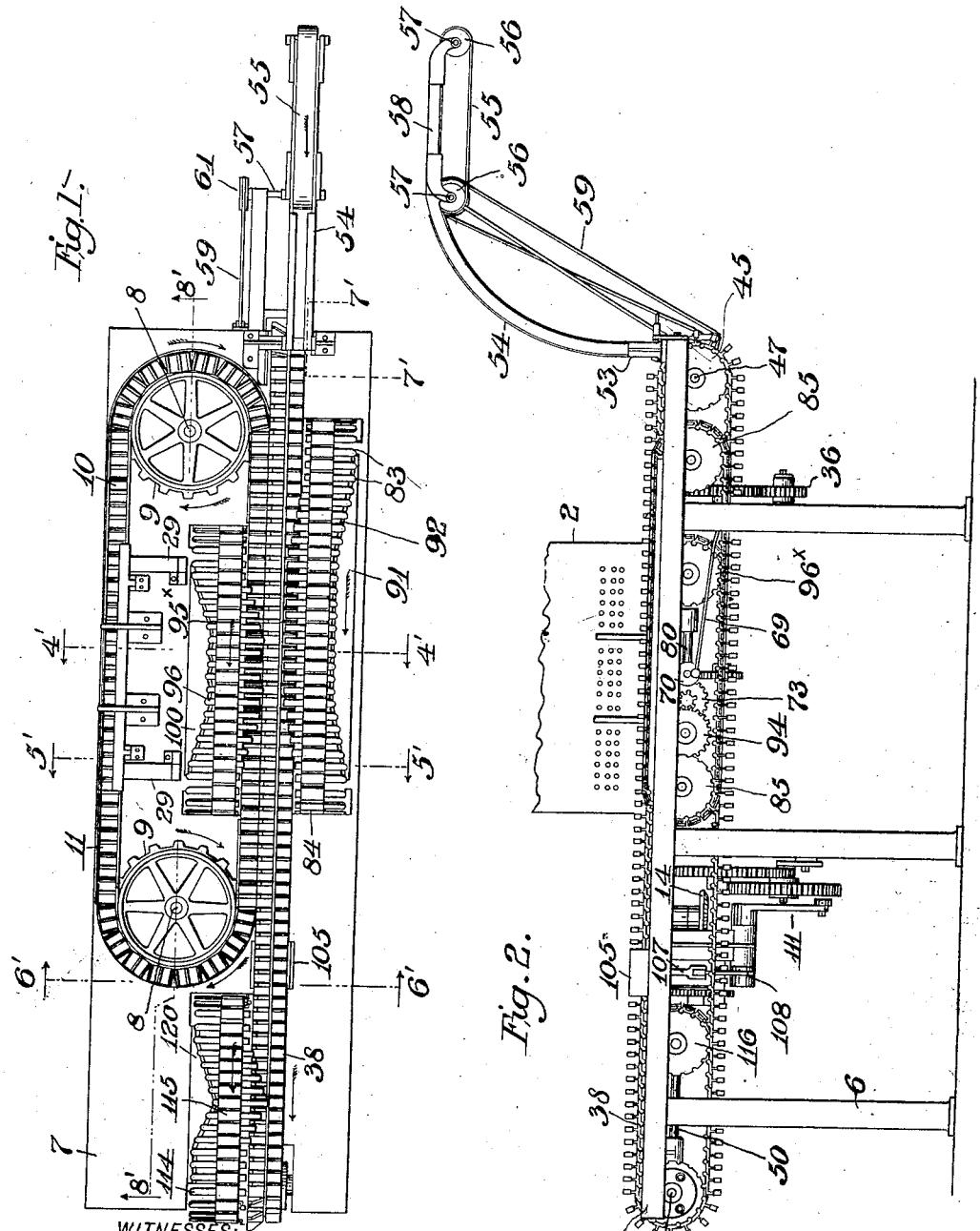

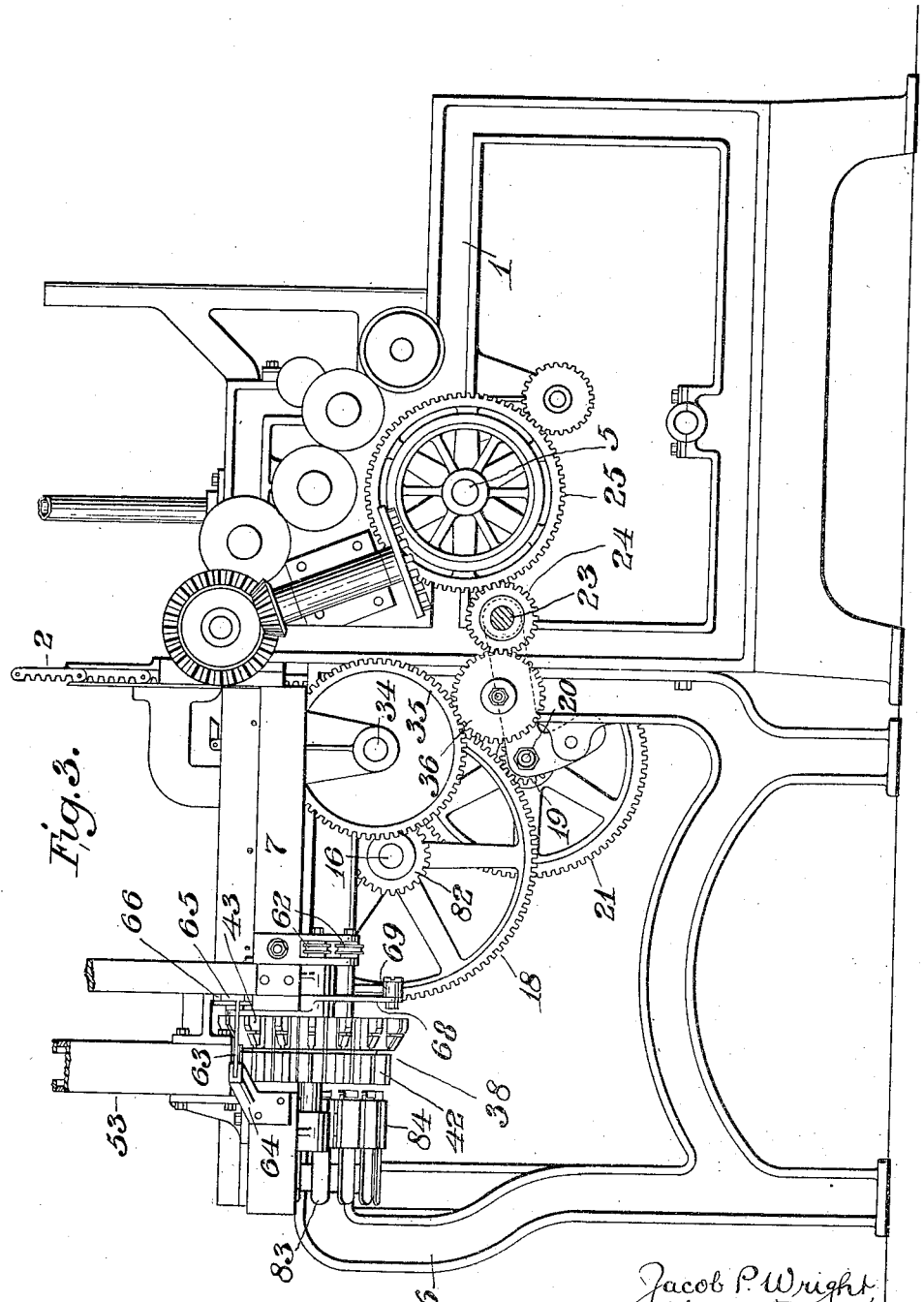

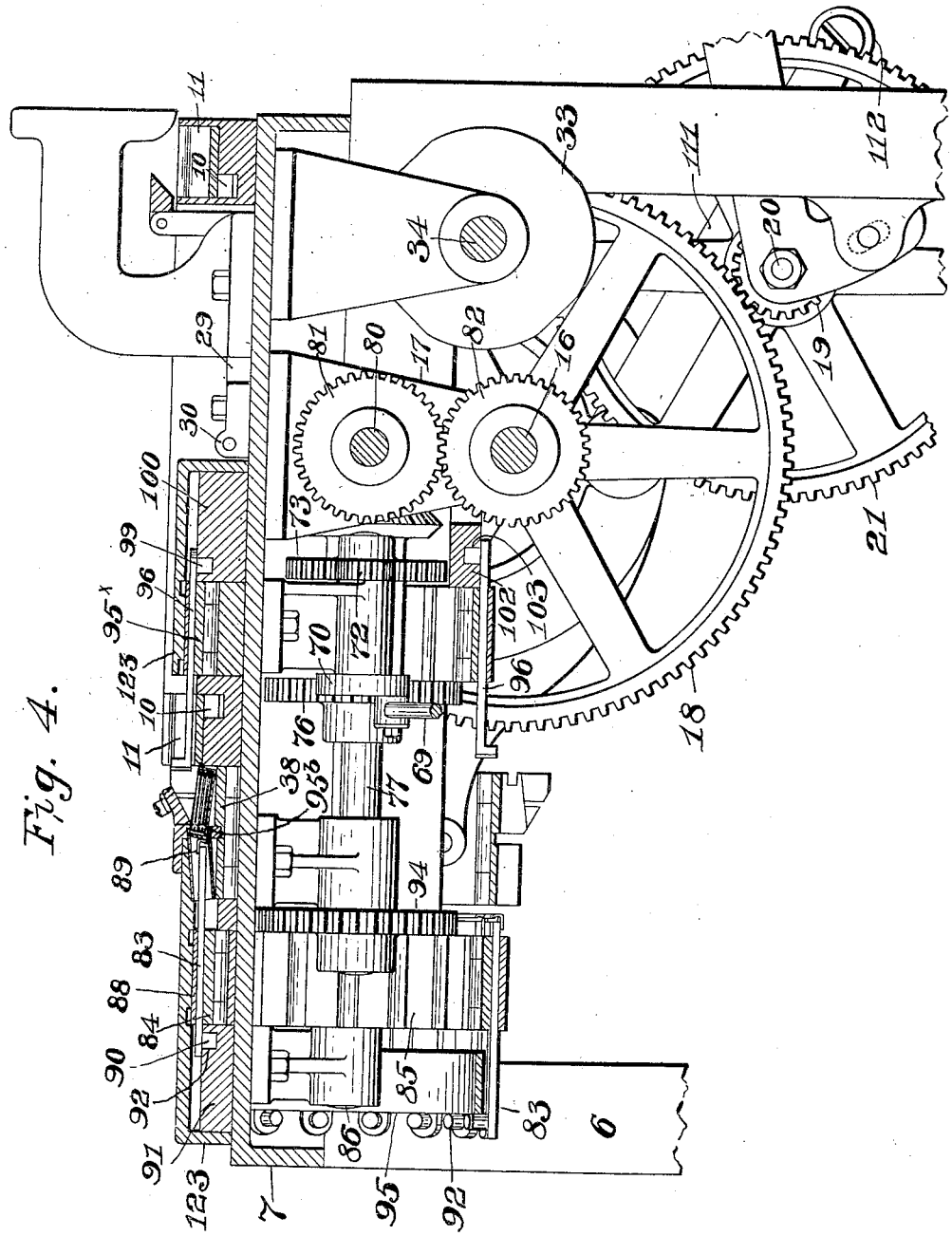

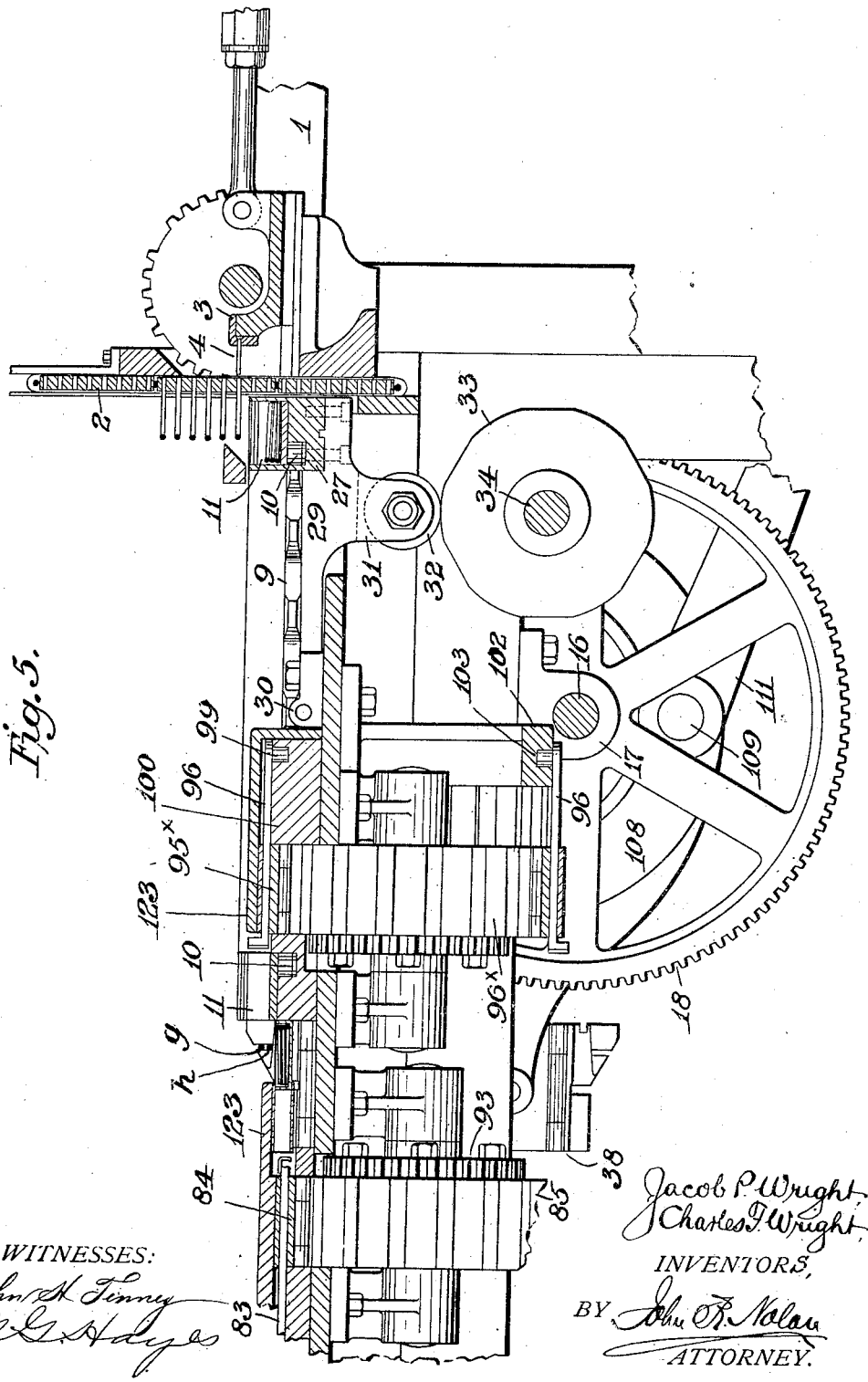

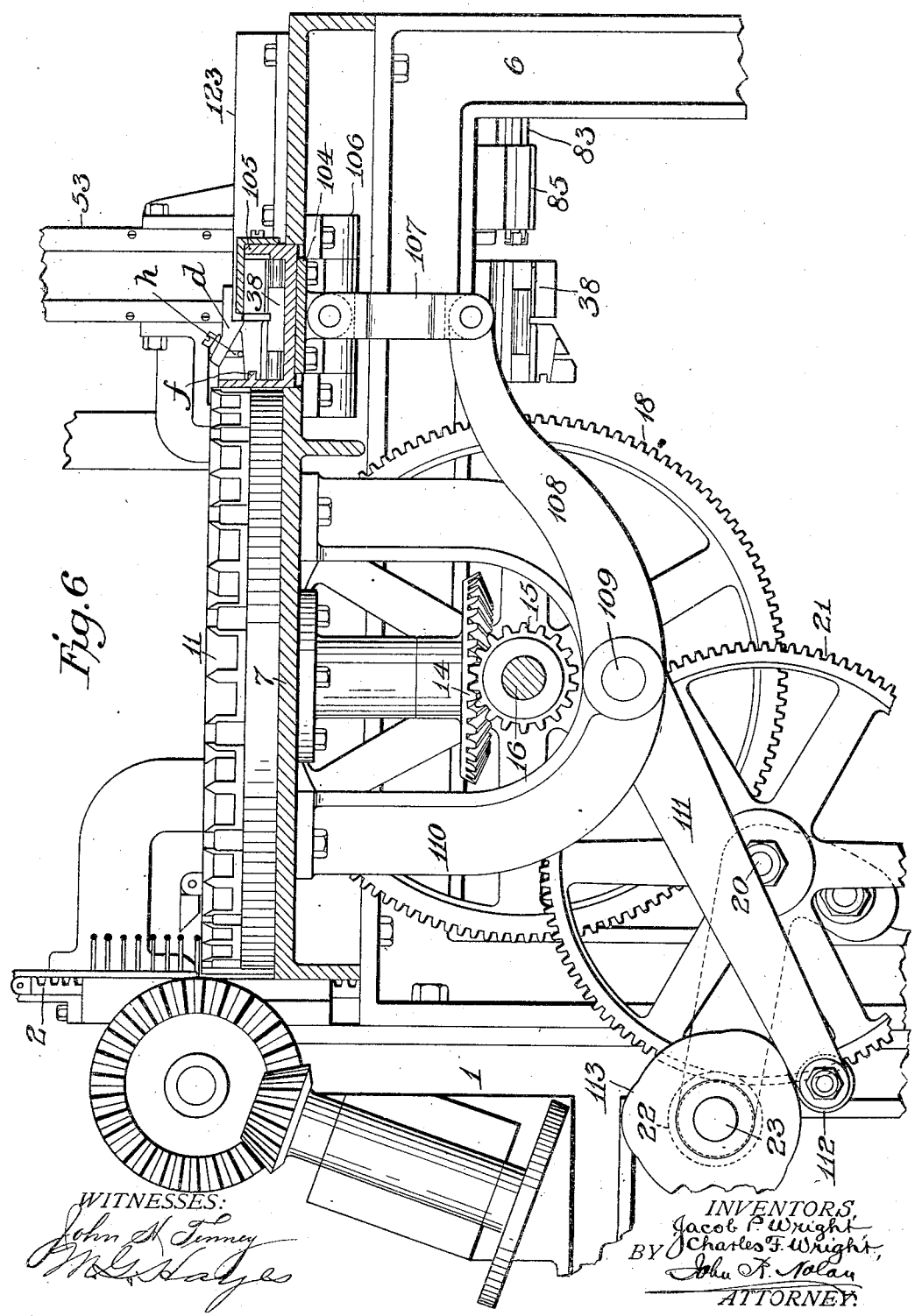

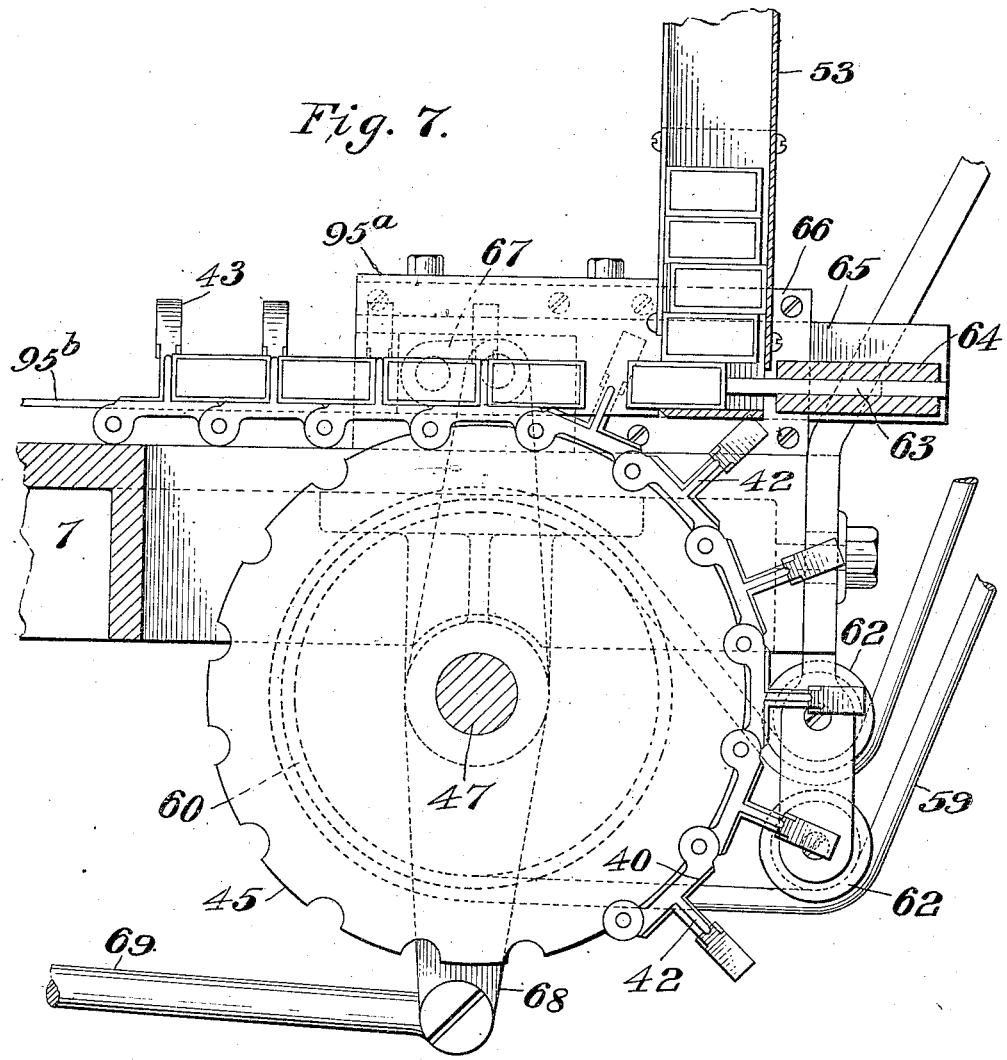

No. 836,730. PATENTED NOV. 27, 1906.
J. P. & C. F. WRIGHT.
BOX FILLING MACHINE.
APPLICATION FILED JUNE 8, 1905.
11 SHEETS—SHEET 7.
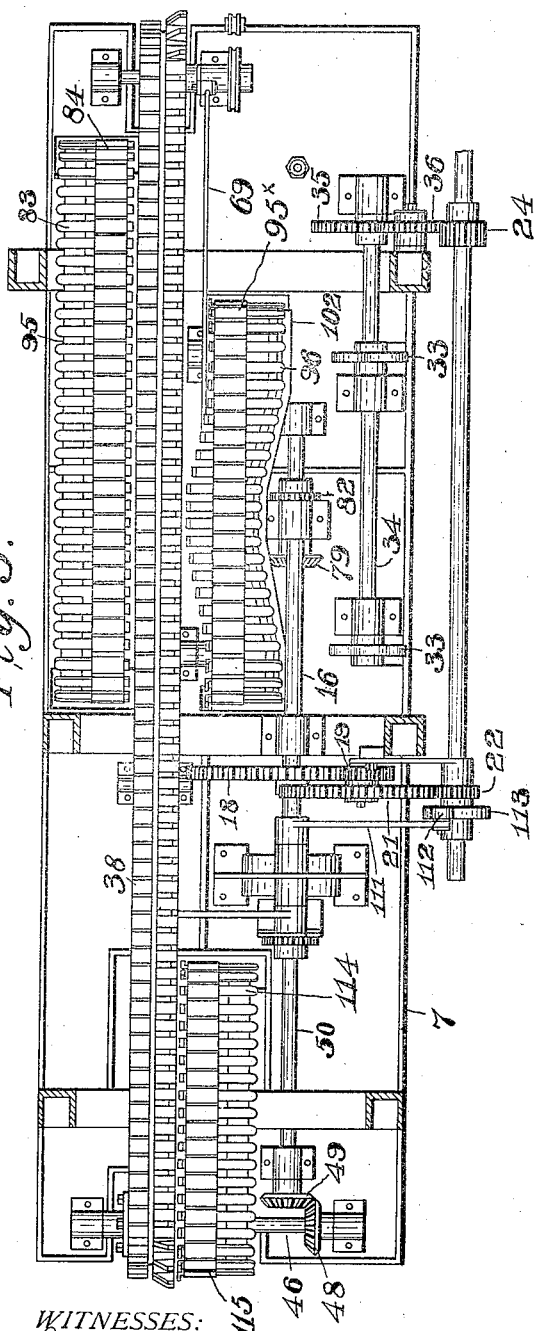
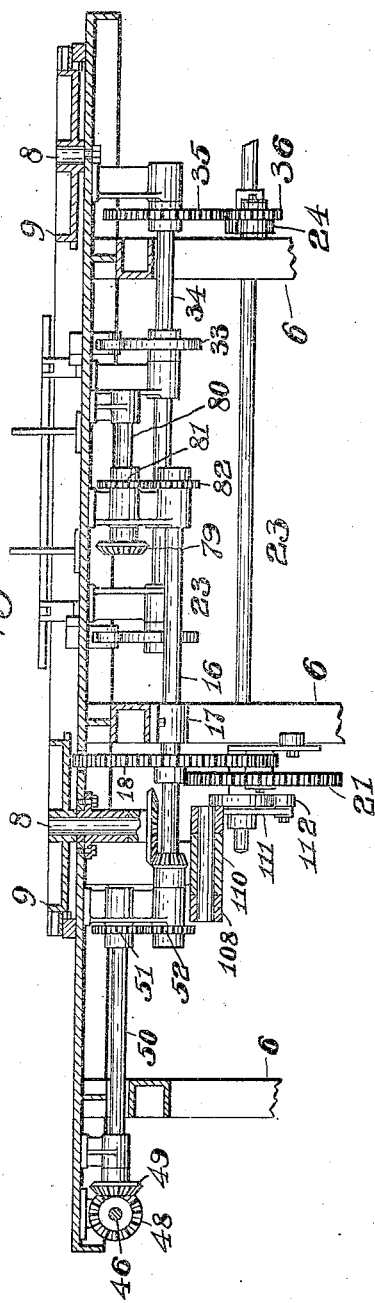
WITNESSES:
John H. Finney
M. E. Hayes
INVENTOR.
Jacob P. Wright
BY Charles F. Wright
John F. Nolen
ATTORNEY.

No. 836,730. PATENTED NOV. 27, 1906.
J. P. & C. F. WRIGHT.
BOX FILLING MACHINE.
APPLICATION FILED JUNE 8, 1905.
11 SHEETS—SHEET 9.
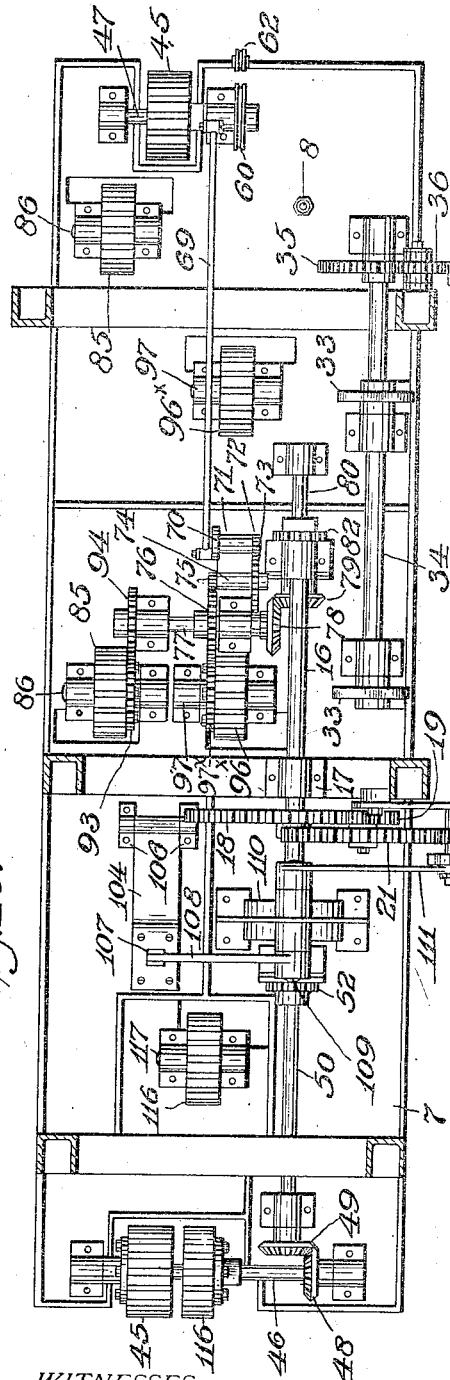
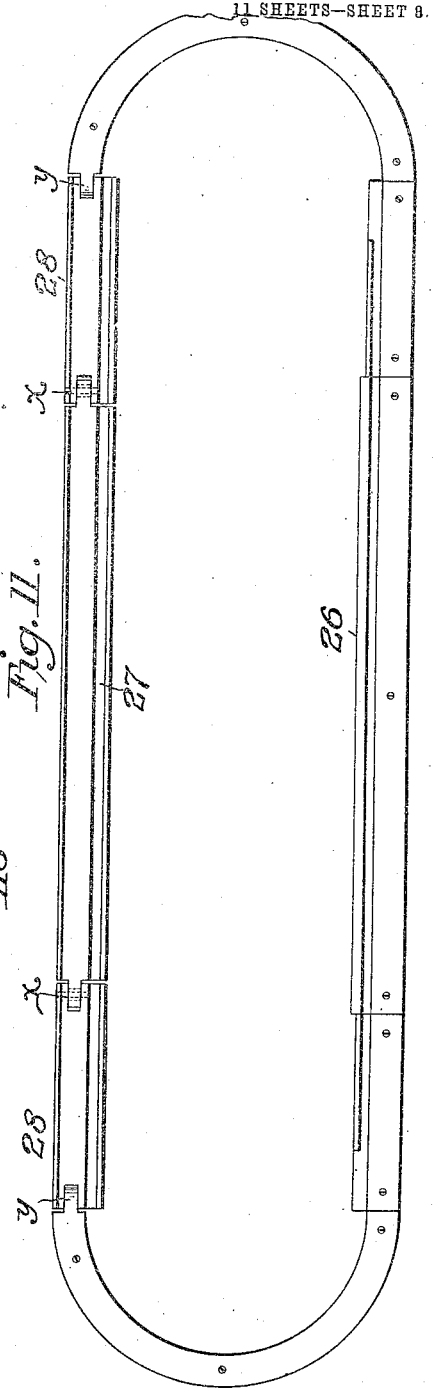
WITNESSES:
INVENTORS
Jacob P. Wright
Charles F. Wright,
BY John F. Nolan
ATTORNEY.

No. 836,730. PATENTED NOV. 27, 1906.
J. P. & C. F. WRIGHT.
BOX FILLING MACHINE.
APPLICATION FILED JUNE 8, 1905.
11 SHEETS—SHEET 9.
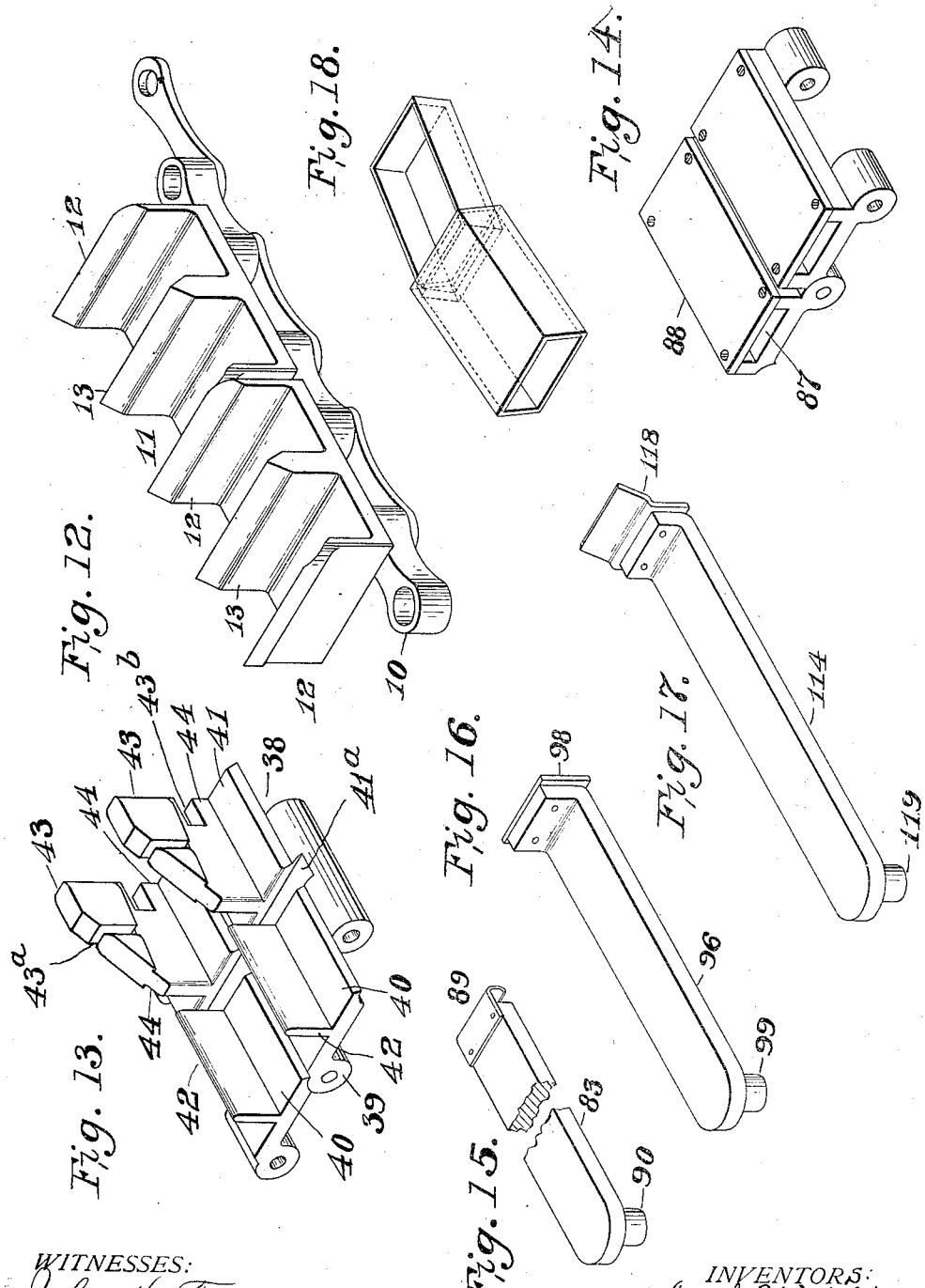
WITNESSES:
INVENTORS:
Jacob P. Wright
Charles F. Wright
BY John F. Nolan
ATTORNEY.

No. 836,730. PATENTED NOV. 27, 1906.
J. P. & C. F. WRIGHT.
BOX FILLING MACHINE.
APPLICATION FILED JUNE 8, 1905.
11 SHEETS—SHEET 10.
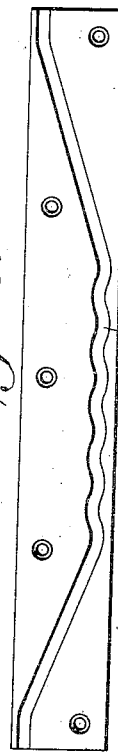
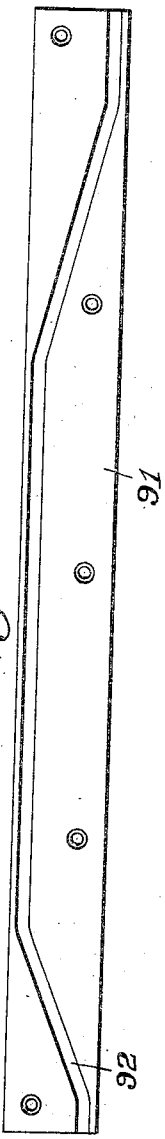
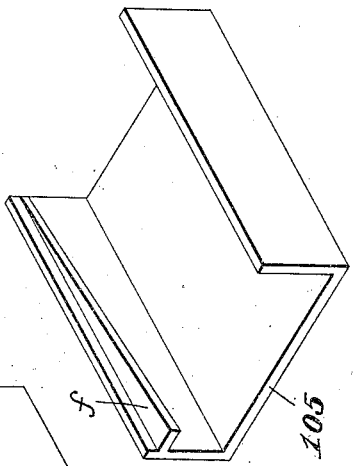
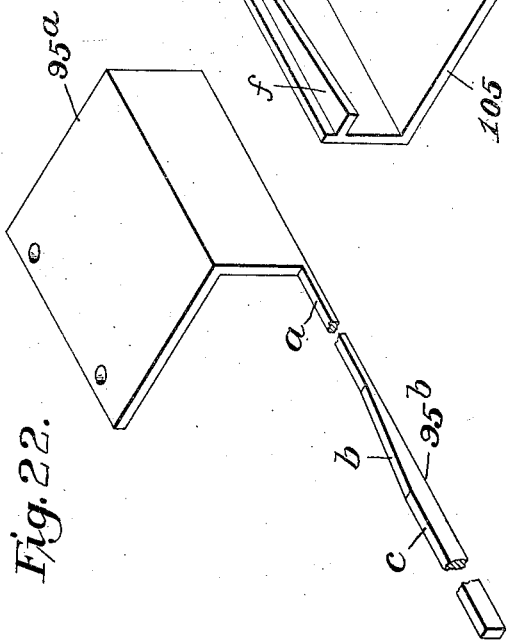
WITNESSES:
INVENTOR.
Jacob P. Wright
BY Charles F. Wright
ATTORNEY.

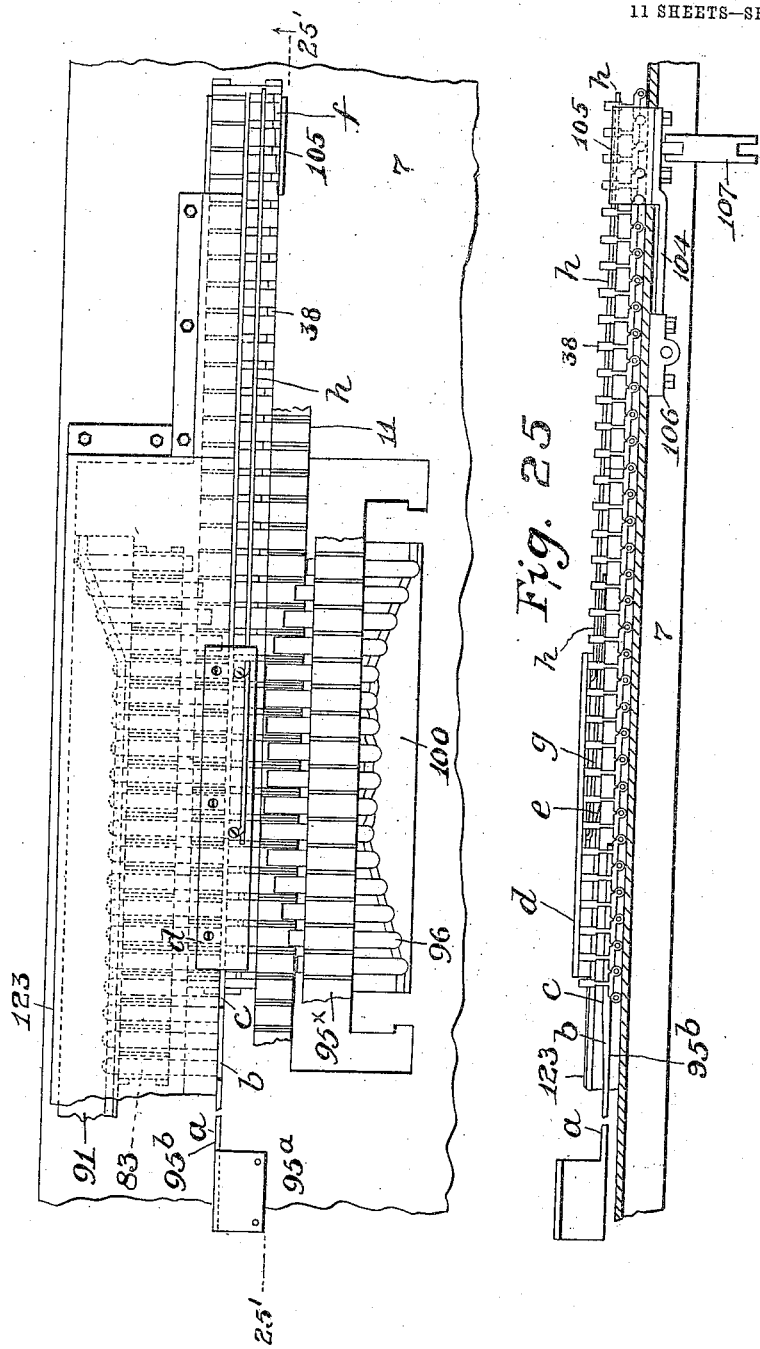

UNITED STATES PATENT OFFICE.

JACOB P. WRIGHT AND CHARLES F. WRIGHT, OF BARBERTON, OHIO, ASSIGNORS TO THE DIAMOND MATCH COMPANY, OF NEW YORK, N. Y., A CORPORATION OF ILLINOIS.

BOX-FILLING MACHINE.

No. 836,730.　　　Specification of Letters Patent.　　　Patented Nov. 27, 1906.

Application filed June 8, 1905. Serial No. 264,203.

*To all whom it may concern:*

Be it known that we, JACOB P. WRIGHT and CHARLES F. WRIGHT, citizens of the United States, and residents of Barberton, in the county of Summit and State of Ohio, have invented certain new and useful Improvements in Box-Filling Machines, of which the following is a specification.

This invention relates to machines for filling boxes with matches or the like, having reference more especially to machines for filling and closing the tray-and-shuck form of box commonly employed for holding matches.

Our invention is herein illustrated as embodied in a box-filling machine in which are employed two continuously-movable endless series of receptacles arranged in juxtaposition, one series constituting temporary holders to receive and assemble the matches as rapidly as they are discharged from the match-making machine and the other constituting holders for boxes into which the matches are endwise delivered from the temporary holders.

The object of the present invention is to adapt a machine of the character mentioned to the expeditious and effective filling and closing of the tray-and-shuck form of box; and to this end the invention, stated generally, comprises various novel features of construction and combinations of parts, which will be hereinafter particularly described and claimed.

In the annexed drawings, Figure 1 is a plan of a box-filling machine embodying our invention, certain parts, including the cap-plates for the plunger and box-carriers, being omitted for clearness of illustration. Fig. 2 is a front elevation of the machine, said parts being also omitted and a portion of the match-carrier of a match-machine being indicated. Fig. 3 is an end elevation of the box-filling machine, on an enlarged scale, showing its connection with the match-machine. Fig. 4 is a transverse vertical section as on the line 4' 4' of Fig. 1, showing an inclined and filled box in the box-carrier. Fig. 5 is a similar section as on the line 5' 5' of Fig. 1, showing a portion of the match-machine in section and also a filled match-box in the box-carrier. Fig. 6 is a similar section as on the line 6' 6' of Fig. 1, showing a portion of the match-machine in elevation. Fig. 7 is a longitudinal vertical section through a portion of the box-feeding end of the machine as on the line 7' 7' of Fig. 1. Fig. 8 is a longitudinal vertical section as on the line 8' 8' of Fig. 1. Fig. 9 is a view of the under side of the bed of the filling-machine, showing the box-carrier, the plunger-carriers and their plungers, and the guide-bars to maintain the plungers in retracted position. Fig. 10 is a similar view with the said carriers omitted, but showing the actuating-gearing therefor. Fig. 11 is a plan of the guide for the endless chain of match-receptacles. Fig. 12 is a perspective view of a portion of the said chain. Fig. 13 is a similar view of a portion of the box-carrier chain. Fig. 14 is a similar view of one of the links of a plunger-chain. Fig. 15 is a similar view of one of the endless series of plungers which push the trays open to receive the matches. Fig. 16 is a similar view of one of the endless series of plungers which push the matches into the trays. Fig. 17 is a similar view of one of the endless series of plungers for closing the boxes. Fig. 18 is a perspective view of a box, showing the tray in open position to receive the matches. Figs. 19, 20, and 21 are plans of the cams for actuating the plungers shown in Figs. 15, 16, and 17, respectively. Fig. 22 is a perspective view of the stationary cam-bar for inclining the traveling box. Fig. 23 is a similar view of the guide and cam device upon and by which the filled boxes are jarred and partially closed. Fig. 24 is a partial plan, on an enlarged scale, of a portion of the bed of the machine, showing the relative positions of the yielding pressure-rods, the match-delivering plungers, and other parts. Fig. 25 is a longitudinal section as on the line 25' 25' of Fig. 24.

1 is a portion of the main frame of a match-making machine; 2, a portion of the match-carrier; 3, the reciprocating head carrying a row of punches 4 for ejecting the matches row by row from the carrier, and 5 a driven shaft of the machine. These parts being of any usual or approved construction need no detailed description herein.

Supported upon suitable standards 6 at the end of the machine-frame and on a plane below the line of discharge of the matches from the carrier is a horizontal bed 7. In this bed at points beyond the respective edges of the match-carrier 2 are journaled vertical shafts 8, which carry at their upper ends sprocket-wheels 9. Passing around these wheels is an endless sprocket-chain 10, provided throughout its length with receptacles 11, which are arranged to travel adjacent the match-carrier and to receive and assemble the matches discharged therefrom. These receptacles constitute temporary holders for the matches. They form, in effect, links of the sprocket-chain and comprise in the present instance flat rectangular bottom plates provided each with side walls 12 and an intermediate division-wall 13, the two chambers thus formed being open at their respective ends. Each of the chambers is equal to or slightly greater in length than the matches and is of a width and height to receive and hold a sufficient quantity of matches for a box. The adjoining side walls of the train or series are in close proximity to each other, and their upper edges, including those of the central walls, are preferably beveled or tapered, as shown, to facilitate the entrance of the matches to the chambers.

The shaft 8 of one of the wheels 9 carries at its lower end a bevel-wheel 14 in mesh with a similar wheel 15 on a horizontal shaft 16, that is mounted in brackets 17, depending from the bed. The shaft 16 is driven in any suitable manner. In the present instance it carries a spur-wheel 18, which meshes with a pinion 19 on a lower stud-shaft 20. This stud-shaft in turn carries a spur-wheel 21, which meshes with the pinion 22 on a horizontal shaft 23, and the latter shaft carries a pinion 24, which meshes with a spur-wheel 25 on the shaft 5 of the match-machine. Thus the motion is transmitted from the shaft 5 to the shaft 16, and hence the endless chain of temporary match-holders is continuously impelled at a prescribed rate of speed across the path of the stream of matches ejected from the match-carrier. This chain during its traverse in front of the match-carrier is preferably jarred or agitated in a manner to cause the matches to settle down within the temporary holders. For this purpose the guide 26, upon which the chain is supported during its traverse, is provided with a movable portion in front of the match-carrier, and means are provided for vertically agitating such portion. In the present instance this portion comprises a trough or runway composed of three sections, whereof the middle section 27 extends entirely across the front of the match-carrier and is jointed at its ends, as at $x$, to the other or shorter sections 28, and the latter are jointed at their outer extremities, as at $y$, to the stationary portions of the guide. The section 27 is supported upon the free ends of a pair of arms 29, which are pivoted to brackets 30 on the bed. These arms have depending ears 31, provided with antifriction-rollers 32, which rest upon underlying cams 33, carried by a horizontal shaft 34. One end of this shaft is provided with a spur-wheel 35, which is geared with the pinion 24 on the driven shaft 23 through an idler-gear 36. Thus the shaft 34 and its cams are continuously rotated during the operation of the machine in a manner to effect the rapid vertical reciprocation of the central trough-section and its end members. It will be seen that the greatest extent of vibration is imparted to the central section (where the matches are introduced to the receptacles) and thence gradually to the outer extremities of the trough. Thus a gradually-increasing vibration of the chain is had while the holders are passing to the carrier and a gradually-decreasing vibration is had while the holders supplied with matches are passing from the carrier. This operation avoids an abrupt stoppage of the agitating motion upon the matches when the motion of the machine is arrested, and hence the otherwise liability of disarranging the matches in the holders is obviated.

The temporary holders with their contents pass to and around the sprocket-wheel 9 at the right-hand end of the machine, as indicated by the arrow in Fig. 1, and during the return traverse of the holders the matches are pushed endwise therefrom into box-trays, which are partially entered in their shucks, as will presently appear.

38 is an endless carrier, termed a "box-carrier," comprising hingedly-connected links provided with box-receptacles which correspond in number and relation with the temporary holders and are arranged to travel adjacent to and at the same rate of speed as said holders. Each of the links includes a body 39, having two flat horizontal surfaces 40 41, with an intervening longitudinal groove or guideway 41$^a$. The surface 41 is slightly elevated, as shown. The lower surface is provided with a comparatively thin vertical wall 42 about equal in height to that of the box-shuck, and the upper surface is provided with a thicker wall 43, extending somewhat higher than the box and being recessed or offset longitudinally on both sides, as at 44. The wall 43 is provided with vertical and horizontal slots 43$^a$ 43$^b$, respectively, the functions of which will presently appear. When the links are united, the space between each pair of adjacent walls 42 is sufficient to receive and hold the interposed shuck, while that between the recessed portions of the walls 43 is sufficient to receive and hold the portion of the tray extending from the shuck, the slight vertical space between the two surfaces compensating for the thickness of the shuck. The box-carrier 38 passes around a pair of sprocket-wheels 45, carried by transverse shafts 46 47, arranged at the respective ends of the bed. The shaft 46 is provided with a bevel-wheel 48 in mesh with a similar wheel 49, carried by a shaft 50, having its bearings in brackets on the under side of the bed. The shaft 50 carries a gear-wheel 51 in mesh with a similar wheel 52 on the driven shaft 16, previously described, which actuates the match-holders, and hence the box-carrier is impelled in concert with said holders. At one end of the bed adjacent the path of the box-carrier is a vertical hopper 53, in which the closed boxes are superposed. The boxes are conveniently delivered to this hopper by means of an inclined chute 54, Figs. 1 and 2, to which they are conveyed by a horizontally-traveling apron 55, upon which the closed boxes are deposited by an attendant. This apron passes around rollers 56, carried by shafts 57, supported in a suitable frame 58 at the top of the chute, the apron being impelled in any suitable manner from a revolving element of the machine. In the present instance the motion is transmitted to the apron by means of a band 59, passing from a pulley 60 on the shaft 47 of the sprocket-wheel 45 and around a sheave 61 on one of the roller-shafts 57, suitably arranged idlers 62 for the band being provided. The wall of the hopper facing the box-carrier is open at its lower end to permit the discharge one by one of the lowermost boxes and their disposition into the succeeding spaces between the walls 42 of adjoining links as the latter round the top of the wheels. The links thereupon as they assume a horizontal position serve as jaws to grasp and firmly hold the boxes. (See Fig. 7.)

The boxes are severally discharged from the hopper by a horizontally-reciprocating plunger 63, mounted in a guide-bar 64 at the end of the bed. This plunger is carried by a slide 64, which is fitted to a horizontal guide 66 on the top of the bed, the slide being pivotally connected, by means of a link 67, to the upper arm of a vertical rock-lever 68, loosely mounted on the shaft 47. The lower arm of this lever is connected, by means of a pitman 69, with a crank-disk 70, carried by a shaft 71, journaled in brackets on the under side of the bed. The shaft 71 carries a gear-wheel 72 in mesh with a similar wheel 73 on an adjacent shaft 74, and the latter shaft carries a gear-wheel 75 in mesh with a gear-wheel 76 on a shaft 77, all said shafts having their bearings in suitably-disposed brackets on the under side of the bed. The shaft 77 is provided with a bevel-wheel 78, which coacts with a similar wheel 79 on a shaft 80, and the latter shaft is geared with the driven shaft 16 by the coacting wheels 81 82, respectively. Through this system of gearing the motion is transmitted to the crank-shaft 71 and thence to the box-discharge plunger of the hopper.

As the closed boxes delivered to the chain of holders, as above described, are carried onward thereby the box-trays are progressively pushed horizontally outward between the recessed walls 43 of the chain. The trays, however, remain partially confined within the shucks. The preferred means for thus pushing out the trays comprise a series of plungers 83, carried by an endless chain 84. This chain passes around a pair of sprocket-wheels 85, carried by shafts 86, having their bearings in brackets on the under side of the bed, which bed is appropriately slotted adjacent each of the wheels for the free passage of the chain and its plungers. One of the links of the chain is shown in Fig. 14, wherein, it will be observed, the link is recessed, as at 87, and provided with a cap-plate 88 to afford a guide for the plunger 83. (Shown detached in Fig. 15.) There is a plunger for each link of the chain, and each plunger preferably comprises a bar of metal provided at its forward or inner end with an angular piece of spring metal 89, which constitutes a yielding impact-head, and at its outer end with a depending stud 90. On the face of the bed adjacent the path of the chain 84 is a bar 91, (shown in Fig. 19,) having on its upper side a longitudinal cam-groove 92, with which the studs of the respective plungers successively engage during the continuous travel of the carrier, the cam-groove being of a form gradually to move the plungers successively inward toward and across the path of the box-carrier, maintain them in that position for an interval of time, and then gradually and successively retract them from the carrier. The plunger-chain is impelled at the same rate of speed as the box-carrier, and the plungers correspond in number and position with the box-holders. Hence during the concerted travel of the plunger-chain and box-carriers the plungers act positively and uniformly upon the opposing ends of the box-trays and push them partially from the shucks, as previously stated. The plunger-chain is impelled by the provision on the shaft 86 of a gear-wheel 93, which meshes with a wheel 94 on the adjacent shaft 77, before described.

As the plungers travel below the bed their studs 90 take against a suitably-disposed guide-bar 95, which serves to maintain the plungers in retracted position, and thus insure their being in proper position to engage the groove of the cam-bar 92. (See Figs. 4 and 9.)

When the trays have been pushed from their shucks, as hereinbefore described, the trays are preferably inclined, as shown in Figs. 4 and 18, preparatory to the transference of the matches thereto from the temporary holders by means of plunger mechanism hereinafter explained. The inclination of the trays effects the opening of the boxes to the fullest extent for the reception of the matches. It also materially lessens the descent of the forward ends of the matches into the boxes as the matches are being pushed thereinto from the temporary holders, thus reducing the inclination of the matches in respect to the acting ends of the plungers and insuring a more effective impact of the plungers against the opposing ends of the matches. A preferred means for thus inclining and thereafter setting the boxes is as follows, reference being had to Figs. 4, 22, 24, and 25 of the drawings: To the fixed guide 66 on the bed is bolted a bracket 95$^a$, from which extends longitudinally of the box-chain a cam-bar 95$^b$, which is constructed and arranged to lie within the grooves or ways 41$^a$ in the links of the chain as the chain passes to and partially past the match-transferring plungers. The bar is provided with a portion $a$, the top of which is flush, or substantially so, with the surface 40 of the links, a gradually-inclined portion $b$, which rises above such surfaces, and a horizontal portion $c$, which extends from the summit of the incline to a point where the matches are being delivered to the boxes. The relative positions of the parts are such that as the boxes are passing over the portion $a$ of the cam-bar the trays are pushed to the full limit from their shucks, that as the boxes are passing upon the portion $b$ they are inclined thereby to receive the matches, and that as the inclined boxes are passing upon the portion $c$ of the bar the matches are forced over into the trays, some matches wholly entering and others partially entering the trays, according to the way the matches may happen to fall.

Arranged on the bed is a cap-plate 123, which overhangs and confines the box and plunger carriers. The under surface of this plate is beveled to accommodate the inclination of the box while the box is being acted upon by the cam-bar. On the inner edge of this cap-plate is a bar $d$, against the under side of which the upper edge of the inclined slide or shuck bears during its travel, such bar, in addition to the proximate portion of the cap-plate, being formed at a suitable point in front of the plunger mechanism with an inclined portion $e$, which acts to depress the boxes to their original or horizontal position on the box-carrier.

The mechanism hereinbefore alluded to for transferring the matches from the filled temporary holders into the box-trays is preferably of the following description: 95$^\times$ represents an endless chain similar in construction to the chain 84 above described and bearing likewise throughout its length a series of reciprocable plungers 96. The chain 95$^\times$ passes around sprocket-wheels 96$^\times$ on shafts 97, having their bearings in brackets on the under side of the bed, which, as in the other instance, is slotted for the passage of the chain and its plungers. One of the shafts 97 is provided with a gear-wheel 97$^\times$ in mesh with the gear-wheel 76 on the shaft 77, hereinbefore described. One of the plungers is shown detached in Fig. 16, and, as will be observed, it is provided at its inner end with a rectangular head 98, which is adapted to fit snugly within a chamber of the temporary match-holders, and at its outer end with a depending stud 99. The plunger-chain 95$^\times$, through the gearing described, is also driven at the same rate of speed as the endless series of temporary match-holders, and during the concurrent traverse of the parts the plungers 96 are successively reciprocated in a manner to bear against the opposing ends of the matches and force them endwise from the holders above and into the opposing open trays on the box-carrier. Affixed to the bed in the path of the studs 99 of the plungers on the traveling chain 95$^\times$ is a bar 100, provided with a cam-groove 101, with which the studs engage in a manner to gradually and successively move the plungers into and across the path of travel of the match-carrier, maintain them therein for a brief period, and then similarly retract them. During the period the plungers are in the inward position a slight vibratory movement is imparted thereto to insure the expulsion of the matches from the holders to the trays, which movement is preferably effected by fluting or corrugating the walls of the horizontal portions of the cam-groove, as seen in Fig. 20.

To maintain the plungers uniformly in retracted position while they are traveling below the bed, and thus insure their being in proper position to engage the cam-groove when they return to the top of the bed, we arrange beneath the bed a bar 102, which is provided with a horizontal groove 103 to receive and guide the studs 99 during their traverse.
(See Figs. 4, 5, and 9.)

As the trays filled with matches are carried onward by the box-carrier they are advantageously acted upon by a jarring device, which insures the settling of the matches down into the trays before the box is closed. This device is shown in Figs. 2, 6, 10, and 23 of the drawings. As illustrated, it comprises a vibratory arm 104, provided at its free end with a seat or guide 105, upon and through which the box-carrier passes just before the carrier reaches the mechanism for pushing the trays fully into their shucks. The arm is pivoted at one end to and between a pair of brackets 106 on the under side of the bed, the free end of the arm being connected by means of a link 107 to an arm 108, carried by a rock-shaft 109, journaled in a bracket 110, depending from the bed. Extending from this rock-shaft is an arm 111, provided at its free end with a roller 112, which normally bears against a suitable cam 113, fast on the driven shaft 23, previously described. This cam, during its rotation, rapidly vibrates the arm 111 and its connected parts, thereby effecting the jarring of the portion of the box-carrier riding upon the guide 105.

The inner wall of the guide 105 adjacent the outer ends of the trays successively traveling therethrough is preferably provided with an inclined rib $f$, which extends into the recesses or slots $43^b$ in the walls 43 of the latter. The outer ends of the advancing trays thus contact with the rib and are thereby pushed partially into their respective slides. By jarring and partially closing the boxes at the same time very efficient results are attained.

In order to press the matches gently down into the trays while the matches are being transferred thereto from the temporary holders, we affix to the bar $d$ one end of a flexible rod $g$, which extends longitudinally of the box-carrier and inclines downwardly thereto, the slots $43^a$ in the walls 43 of the chain-links receiving the rod and permitting its yielding pressure down upon the contents of the boxes.

Immediately after the boxes have been pressed down to a horizontal position they are carried under this rod, and during their travel below the same the match-delivering plungers continue to act against the matches through the instrumentality of the corrugated portion of the cam 100, hereinbefore described. Inasmuch as many of the matches may be greatly inclined in respect to the plungers, and thus, when brought to a horizontal position by the pressure of the rod thereon, tend to advance toward the plungers, it follows that the continued action of the plungers against the matches forces them back into the boxes. The agitation of the matches within the boxes thus occasioned assists, in conjunction with the pressure of the rod, in settling the matches fairly well within the boxes.

In order to hold the matches in position while they are being jarred in their boxes and while such boxes are being partially closed, we also affix to the bar $d$ one end of a long yielding rod $h$, that, extending longitudinally of the box-carrier to and slightly beyond the guide-piece 105, bears upon the contents of the boxes while the latter are passing through the guide. The rod $h$ also enters the slots $43^a$ in the walls of the chain-links. This rod bears very lightly upon the matches, so as not to prevent their changing position while settling down within the boxes in perfect order.

The means for completing the introduction of the trays to their slides is substantially similar in construction and operation to the means hereinbefore described for pushing out the slides, comprising similarly thereto an endless series of reciprocable plungers 114, carried by a chain 115. This chain passes around a pair of sprocket-wheels 116, one of which is carried by the driven shaft 46, hereinbefore referred to, and the other wheel is carried by a shaft 117, journaled in brackets on the under side of the bed. Thus the chain 115 is driven concurrently with the box-carrier. One of the plungers is shown detached in Fig. 17. It is provided at its inner end with an angular head-plate 118, which is designed to take against the opposing end of the box-tray, and at its opposite end with a depending stud 119. Suitably disposed on the bed is a cam-bar 120, (shown in Fig. 21,) with the groove 121 of which the studs of the several plungers 114 engage during the traverse of their carrying-chain, the grooves being appropriately formed to gradually and successively advance the plungers into and across the path of the box-carrier and then similarly to retract the same. This completes the operation. As the filled boxes reach the end of the bed they fall from the box-chain upon a table or other suitable receptacle.

Preferably a grooved bar 122, similar to the bar 102 previously described, is disposed beneath the bed in position to receive and guide the studs of the plungers 114 in their return travel below the bed.

From the foregoing it will be seen that the upper receiving and carrying portions of the endless chains of match and box holders travel continuously and uninterruptedly in a horizontal plane, or substantially so; that the correspondingly traveling carriers for the respective plungers extend toward, longitudinally of, and away from such portions of the said chains; that thereby the plungers of the respective carriers are progressively impelled to and in a path alongside of and in substantially the same horizontal plane with the holders; that during the concurrent travel of the plunger-carriers longitudinally of and adjacent to the respective box and match holders the plungers are reciprocated horizontally, or substantially so, transversely of their carriers to effect their respective match-transferring, tray-opening, and tray-closing functions, hereinbefore explained. It will also be seen that owing to the continuous and uninterrupted travel of the match and box holders and the coaction therewith of the respective traveling plungers a machine is provided which is coöperative with a match-making machine of large productive capacity to accomplish the expeditious and effective filling and closing of the tray and shuck form of box.

We claim—

1. In a box-filling machine, the combination of a series of traveling holders movable in a horizontal plane, or substantially so, a flexible carrier extending toward, longitudinally of, and away from the path of said holders, a series of plungers supported by said carrier and progressively impelled thereby to and in a path alongside of, and in substantially the same horizontal plane with, the holders, means for concertedly impelling the holders and the longitudinally-adjacent portion of the carrier in the same direction and at the same rate of speed, and means for reciprocating horizontally, or substantially so, the plungers of such portion of the carrier transversely of the path of travel of the holders and of the carrier.

2. In a box-filling machine, the combination of a series of traveling holders movable in a horizontal plane, or substantially so, an endless flexible carrier extending toward, longitudinally of, and away from the path of said holders, a series of plungers supported at intervals by and throughout the length of said carrier and progressively impelled thereby to and in a path alongside of, and in substantially the same horizontal plane with, the holders, means for concertedly impelling the holders and the longitudinally-adjacent portion of the carrier in the same direction and at the same rate of speed, and means for reciprocating horizontally, or substantially so, the plungers of such portion of the carrier transversely of the path of travel of the holders and of the carrier.

3. In a box-filling machine, the combination of a series of temporary match-holders movable in a horizontal plane, or substantially so, an endless chain of links extending toward, longitudinally of, and away from the path of said holders, plungers supported by the respective links of said chain and progressively impelled thereby to and in a path alongside of, and in substantially the same horizontal plane with, the holders, means for concertedly impelling the holders and the longitudinal portion of the chain in the same direction and at the same rate of speed, and means for reciprocating horizontally, or substantially so, the plungers of such portion of the chain transversely of the path of travel of the holders and of the chain.

4. In a box-filling machine, the combination of an endless chain of holders movable in a horizontal plane, or substantially so, an endless chain of links extending toward, longitudinally of, and away from the path of said holders, plungers supported by the links of said chain and progressively impelled thereby to and in a path alongside of, and in substantially the same horizontal plane with, the chain of holders, means for concertedly impelling the adjacent longitudinal portions of said chains in the same direction and at the same rate of speed, and means for reciprocating horizontally, or substantially so, the plungers transversely of the path of travel of the holders and of the carrier.

5. In a box-filling machine, the combination of an endless chain of holders movable in a horizontal plane, or substantially so, an endless chain of links extending toward, longitudinally of, and away from the path of said holders, plungers supported by the links of said chain and progressively impelled thereby to and in a path alongside of, and in substantially the same horizontal plane with, the chain of holders, means for concertedly impelling the adjacent longitudinal portions of said chains in the same direction and at the same rate of speed, and a stationary cam with which the plungers coact during their traverse, whereby the said plungers are reciprocated horizontally, or substantially so, across the path of travel of the holders as they move onward therewith.

6. In a box-filling machine, the combination of a series of temporary match-holders movable in a horizontal path, or substantially so, an endless flexible carrier extending toward, longitudinally of, and away from, the path of said match-holders, plungers supported by and throughout the length of said carrier, and progressively impelled thereby to and in a path alongside of, and in substantially the same horizontal plane with, the match-holders, means for continuously moving said holders and the adjacent longitudinal portion of the carrier in the same direction and at the same rate of speed, and means for reciprocating the plungers in such portion of the carrier horizontally, or substantially so, into and across the path of travel of the match-holders as they travel along therewith, whereby the matches are progressively expelled from the said match-holders.

7. In a box-filling machine, the combination of a series of horizontally-traveling holders for tray and shuck boxes, an endless flexible carrier extending toward, longitudinally of, and away from, the path of said holders, plungers supported by and throughout the length of said carrier, and progressively impelled thereby to and in a path alongside of, and in substantially the same horizontal plane with, the holders, means for continuously moving said holders and the adjacent longitudinal portion of the carrier in the same direction and at the same rate of speed, and means for reciprocating the plungers in such portion of the carrier horizontally, or substantially so, into and across the path of travel of said holders to impinge against and effect the opening of the trays of the boxes carried by the holders.

8. In a box-filling machine, the combination of a series of horizontally-traveling holders for sustaining tray and shuck boxes with their trays in open position, an endless flexible carrier extending toward, longitudinally of, and away from, the path of said holders, plungers supported by and throughout the length of said carrier, and progressively impelled thereby to and in a path alongside of, and in substantially the same horizontal plane with, the holders, means for continuously moving said holders and the adjacent longitudinal portion of the carrier in the same direction and at the same rate of speed, and means for reciprocating the plungers in such portion of the carrier horizontally, or substantially so, in respect to the path of travel of said holders to push into their shucks the open trays of the boxes carried by said holders.

9. In a box-filling machine, the combination with a series of box-holders, and means for impelling the same, of two oppositely-disposed sets of plungers, whereof one set is adapted to open and the other set to close the trays of boxes in said holders, carriers for the respective sets of plungers, each of said carriers extending toward, longitudinally of and away from the path of the box-holders, means for impelling in concert with the box-holders the longitudinal portions of the respective carriers adjacent thereto, and means for reciprocating the respective sets of plungers in opposite directions across the path of travel of the box-holders.

10. In a box-filling machine, the combination with a series of temporary match-holders, a series of box-holders adjacent thereto, and means for concertedly actuating said match and box holders, of two oppositely-disposed sets of plungers, whereof one set is adapted to open the trays of the boxes in the box-holders and the other set to transfer the contents of the temporary holders to said trays, carriers for the respective sets of plungers, each of said carriers extending toward, longitudinally of and away from the path of the box-holders, means for impelling in concert with the said match and box holders the longitudinal portions of the respective carriers adjacent thereto, and means for reciprocating the said sets of plungers across the paths of travel of the match and box holders, respectively.

11. In a box-filling machine, the combination with a series of temporary match-holders, a series of box-holders adjacent thereto, and means for concertedly actuating said match and box holders, of two oppositely-disposed sets of plungers, whereof one set is adapted to open the trays of the boxes in the box-holders and the other set to transfer the contents of the temporary holders to said trays, carriers for the respective sets of plungers, each of said carriers extending toward, longitudinally of and away from the path of the box-holders, means for impelling in concert with the said match and box holders the longitudinal portions of the respective carriers adjacent thereto, means for reciprocating the said sets of plungers across the paths of travel of the match and box holders, respectively, and means for closing the filled boxes.

12. In a box-filling machine, the combination with a series of temporary match-holders, a series of box-holders adjacent thereto, and means for concertedly actuating said match and box holders, of two oppositely-disposed sets of plungers, whereof one set is adapted to open the trays of the boxes in the box-holders and the other set to transfer the contents of the temporary holders to said trays, carriers for the respective sets of plungers, each of said carriers extending toward, longitudinally of and away from the path of the box-holders, means for impelling in concert with the said match and box holders the longitudinal portions of the respective carriers adjacent thereto, means for reciprocating the said sets of plungers across the paths of travel of the match and box holders, respectively, a third set of plungers adapted to close the filled boxes, a carrier for the last-named plungers, means for actuating this carrier, and means for reciprocating its plungers across the path of travel of the box-holders.

13. In a box-filling machine, the combination with a series of temporary match-holders, of means for ejecting the matches therefrom comprising a series of plungers, a carrier for said plungers, and means for reciprocating said plungers with a vibratory or jarring action across the path of travel of the match-holders.

14. In a box-filling machine, the combination with a series of temporary holders for matches, of a plunger for ejecting the matches endwise from said holders, and means for reciprocating said plunger with a rapid vibratory or jarring action transversely of the match-holders, whereby a tremulous impact is exerted upon the ends of the matches while they are being ejected.

15. In a box-filling machine, the combination with means for impelling open trays in a horizontal position, of means in the horizontal path of said trays for engaging and raising one end of said trays during their traverse so as to incline or tilt the same, and means for introducing matches to the inclined trays.

16. In a box-filling machine, the combination with means for impelling open trays in a horizontal position, of means in the horizontal path of said trays for engaging and raising one end of said trays during their traverse so as to incline or tilt the same, means for introducing matches to the inclined trays, and means for returning the trays to their normal plane.

17. In a box-filling machine, the combination with means for impelling open trays in a horizontal position, of means in the horizontal path of said trays for engaging and raising one end of said trays during their traverse so as to incline or tilt the same, means for introducing matches to the inclined trays, means for returning the trays to their normal plane, and yielding means bearing upon the matches while they are being introduced to the trays.

18. In a box-filling machine, the combination with means for impelling open trays in a horizontal position, of means for raising one end of said trays to incline or tilt the same, means for introducing matches to the inclined trays, and yielding means extending longitudinally of the path of travel of the trays and bearing upon the matches during and after their introduction to the trays.

19. In a box-filling machine, the combination with means for impelling open trays in a horizontal position, of means for raising one end of said trays to incline or tilt the same, means for introducing matches to the inclined trays, and a thin flexible rod extending longitudinally of the path of travel of the trays and bearing upon the matches during and after their introduction to the trays.

20. In a box-filling machine, the combination with means for impelling open trays in a horizontal position, of means for raising one end of said trays to incline or tilt the same, means for introducing matches to the inclined trays, a thin flexible member extending longitudinally of the path of travel of the trays and bearing upon the matches during and after their introduction to the trays, and means for acting against the ends of the matches while they are passing under said member.

21. In a box-filling machine, the combination with means for impelling slide-boxes having their trays in open position, of means extending into and longitudinally of the path of travel of the boxes for raising the engaged ends of the box-shucks and trays and thereby inclining the same, and means for introducing matches to the inclined open trays.

22. In a box-filling machine, the combination with a traveling carrier on which slide-boxes with trays in open position are carried, of a cam extending into and longitudinally of the path of travel of the boxes with which cam said boxes contact and by which the engaged ends of the box-shucks and trays are raised to incline the shucks and trays, and means for introducing the matches to the inclined open trays.

23. In a box-filling machine, the combination with means for impelling slide-boxes having their trays in open position, of means extending into and longitudinally of the path of travel of the boxes for raising the engaged ends of the box-shucks and trays and thereby inclining the same, means for introducing matches to the inclined open trays, and means for returning the boxes to their normal plane.

24. In a box-filling machine, the combination with a traveling carrier on which slide-boxes having their trays in open position are carried, of a cam extending into and longitudinally of the path of travel of the boxes with which cam said boxes contact and by which the engaged ends of the box-shucks and trays are raised to incline the same, means for introducing matches to the inclined open trays, and means for returning the boxes to their normal plane.

25. In a box-filling machine, the combination with means for impelling slide-boxes having their trays in open position, of means for supplying matches to said boxes, means for bodily jarring the filled boxes, and means for thereafter closing the boxes, said latter means comprising a series of plungers, a carrier for moving them along with the boxes, and devices for progressively reciprocating them into and from the path of travel of the boxes during their longitudinal traverse therewith.

26. In a box-filling machine, the combination with means for impelling slide-boxes having their trays in open position, of means for supplying matches to said boxes, means for bodily jarring the filled boxes, means for partially closing the boxes while they are being jarred, and means for thereafter completing the closing of the boxes, said latter means comprising a series of plungers, a carrier for moving them along with the boxes, and devices for progressively reciprocating them into and from the path of travel of the boxes during their longitudinal traverse therewith.

27. In a box-filling machine, the combination with an endless chain of holders in which the boxes are held with their trays in open position, of means for supplying matches to said boxes, means for bodily jarring the filled boxes, and means for partially closing the boxes while they are being jarred, said latter means comprising an inclined rib or cam which extends into the longitudinal path of travel of the open ends of the trays.

28. In a box-filling machine, the combination with an endless chain of holders in which the boxes are held with their trays in open position, of means for supplying matches to said boxes, means for bodily jarring the filled boxes, means for partially closing the boxes while they are being jarred, and means for thereafter completing the closing of the boxes, said latter means comprising a series of plungers, a carrier for moving them along with the boxes, and devices for progressively reciprocating them into and from the path of travel of the boxes during their longitudinal traverse therewith.

29. In a box-filling machine, the combination with an endless chain of holders in which the boxes are held with their trays in open position, of means for supplying matches to said trays, means for jarring the filled boxes, and means for thereafter closing the boxes, said latter means comprising a series of plungers, a carrier for moving them along with the boxes, and devices for progressively reciprocating them into and from the path of travel of the boxes during their longitudinal traverse therewith.

30. In a box-filling machine, the combination with an endless chain of box-holders in which the boxes are held with their trays in open position, of means for supplying matches to said boxes, means for bodily jarring the holders with the filled boxes, and means for thereafter closing the boxes, said latter means comprising a series of plungers, a carrier for moving them along with the boxes, and devices for progressively reciprocating them into and from the path of travel of the boxes during their longitudinal traverse therewith.

31. In a box-filling machine, the combination with box-holders comprising jointed links having parallel walls to receive and hold closed boxes, of means for opening the said boxes during the travel of the holders, means for supplying matches to the open boxes, and means for thereafter closing said boxes, said latter means comprising a series of plungers, a carrier for moving them along with the boxes, and devices for progressively reciprocating them into and from the path of travel of the boxes during their longitudinal traverse therewith.

32. In a box-filling machine, the combination with an endless chain of box-holders comprising jointed links having parallel walls to receive and hold boxes, of means for supplying closed boxes to said chain, means for opening the said boxes during the travel of the chain, means for supplying matches to the open boxes, and means for thereafter closing said boxes, said latter means comprising a series of plungers, a carrier for moving them along with the boxes, and devices for progressively reciprocating them into and from the path of travel of the boxes during their longitudinal traverse therewith.

33. In a box-filling machine, an endless chain of box-holders comprising jointed links each having a horizontal body portion with surfaces for the support of the shucks and trays, respectively, of the boxes, one of said surfaces being provided with plane parallel walls to embrace the shucks and the other with recessed or offset walls to embrace the trays extending from said shucks and to overhang the upper edges of the side walls of the trays.

34. In a box-filling machine, an endless chain of box-holders comprising jointed links each having two flat horizontal surfaces on different planes, the lower surface being provided with plane vertical walls and the upper surface with recessed or offset walls.

35. In a box-filling machine, the combination of an endless chain of box-holders, two endless chains of plungers between which travels the chain of box-holders, each of said chains of plungers for a portion of its length extending adjacent to and in parallelism with the chain of box-holders, means for impelling the adjacent parallel portions of the respective chains in the same direction and at the same rate of speed, and means for progressively reciprocating the respective sets of plungers toward and from the box-holders as they travel along therewith.

36. In a box-filling machine, the combination with a series of traveling holders, and actuating mechanism therefor, of a trough or way for said holders comprising several sections jointed together and pivotally supported at their outer extremities, and means for vertically jarring said trough or way.

37. In a box-filling machine, the combination with the match-carrier of a match-machine, and means for discharging the matches from said carrier, of a series of traveling holders moving across the path of the matches discharged from said carrier, and a trough or way for said holders comprising several sections jointed together, one section extending throughout the width of said carrier, or substantially so, and the other sections of the trough being pivotally supported at their extremities, as described, together with means for vertically jarring said trough or way.

JACOB P. WRIGHT.
CHARLES F. WRIGHT.

Witnesses to signature of Jacob P. Wright:
    E. C. KERDOLFF,
    W. C. FINDLEY.

Witnesses to signature of Charles Wright:
    B. C. ROSS,
    F. M. ROOT.